…

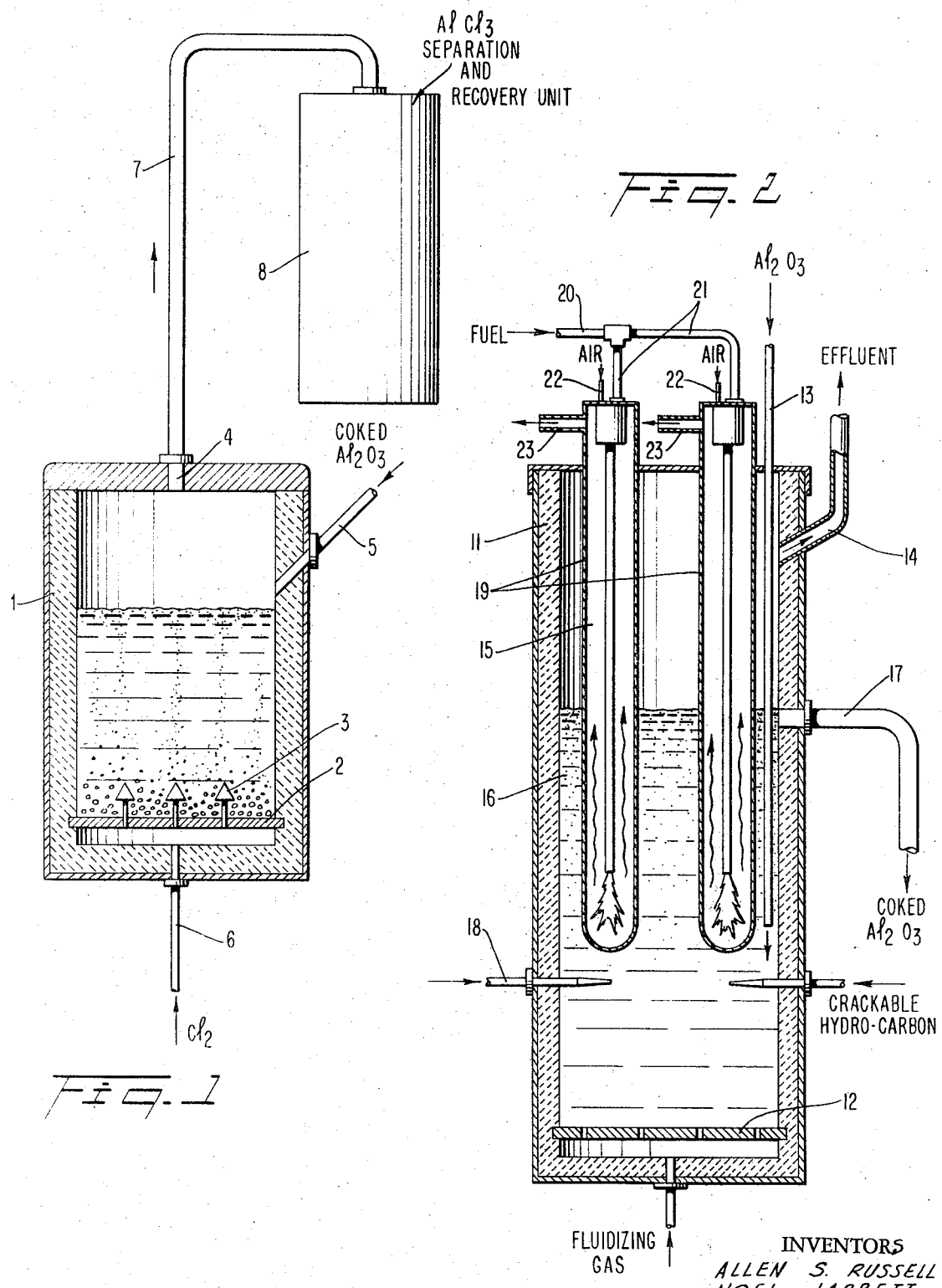

United States Patent Office 3,842,163
Patented Oct. 15, 1974

---

3,842,163
PRODUCTION OF ALUMINUM CHLORIDE
Allen S. Russell, New Kensington, Noel Jarrett, Lower Burrell, and Philip T. Stoup, New Kensington, Pa., assignors to Aluminum Company of America, Pittsburgh, Pa.
Filed Sept. 7, 1971, Ser. No. 178,080
Int. Cl. C22b 1/08, 1/10; C01f 7/60
U.S. Cl. 423—496                                   27 Claims

ABSTRACT OF THE DISCLOSURE

Process for production of aluminum chloride by chlorination of selectively constituted porous alumina intermixed with carbon to produce a gaseous effluent containing economically recoverable aluminum chloride and carbon oxides including substantial amounts of carbon dioxide.

---

The present invention relates to the production of aluminum chloride, and more particularly to an improved process for the exothermic chlorination of selectively constituted porous alumina particles of low alpha alumina content intimately intermixed with carbon to produce a gaseous effluent containing aluminum chloride and carbon oxides, including a substantial amount of carbon dioxide, and of a character that facilitates the economic recovery of high purity aluminum chloride therefrom.

Although the potential advantages of utilizing aluminum chloride as a source material in the electrolytic production of aluminum have long been recognized, commercial realization thereof has been precluded by the inability of the art both to provide aluminum chloride of sufficiently high purity as to be utilizable therein and to provide aluminum chloride in any significant required quantity therefor in an economically acceptable manner. The long standing incentive and need for economically producible high purity aluminum chloride has resulted in extensive experimental exploration and evaluation of numerous suggested expedients for obtaining such long desired result. However, to date none of these suggested expedients has succeeded in satisfying the desired objective of commercial quantity production of economically producible high purity aluminum chloride.

In general, the reduction of alumina-containing materials with chlorine in the presence of reducing carbon in some form to produce aluminum chloride is an old and generally well-known reaction and one of the suggested expedients referred to above utilized bauxite as the alumina containing material. Bauxite however, normally contains many impurities including iron oxide, silica and titania. Since these impurities readily react with chlorine in the presence of carbon to form iron, silicon and titanium chlorides, the usual gaseous aluminum chloride reaction effluent therefrom must be subjected to cumbersome and expensive after-purification measures if these chloride contaminants are to be separated to provide even a reasonably pure aluminum chloride product.

In accordance with one aspect of this invention, the chlorination reaction is carried out with alumina rather than with bauxite as a starting material. The term "alumina" generally will be hereinafter employed to designate an $Al_2O_3$ product after the same has been extracted from its ores. A common source of alumina is that produced by the well known Bayer process, in which raw bauxite ore is extracted with caustic soda to dissolve selectively the aluminum content as sodium aluminate while leaving behind the iron, silicon and titanium contents as insoluble impurities, followed by recovery of alumina, e.g. as Bayer hydrate, from the resulting solution. However, by reason of the caustic soda treatment, the Bayer process alumina is normally contaminated with sodium impurities, e.g. soda ($Na_2O$), which lead to the formation of sodium aluminum chloride and other sodium based impurities during chlorination thereof.

Reactions for producing aluminum chloride from alumina and alumina containing materials, in which the reducing carbon is present as phosgene, carbon tetrachloride and/or carbon monoxide, have also been employed by the art but commercial utilization of such processes has been impeded, if not precluded, by the inordinate expense of these starting materials and their hazardous nature.

When solid carbon is used for carrying out the reduction of bauxite with chlorine to form aluminum chloride, a complex phase phenomenon is involved in which two solid materials must be reacted with a gas. This reaction is known to proceed exothermically at somewhat lower temperatures if the carbon, as for example in the form of coke, is predisposed on the bauxite particles. Such predisposition has been heretofore accomplished either by mechanical mixing of carbon powder or particles with bauxite followed by molding of the mass into briquettes and usually followed by removal of volatiles therefrom, or by pretreating the bauxite with hydrocarbon, as for example by methane or other gas or by viscous or solid asphalt-containing materials, in such manner that the hydrocarbon is cracked and/or coked to form carbon coated bauxite particles. Such cracking procedures are conventionally attended by very high cracking temperatures.

Although moisture or other forms of hydrogen are often present on the carbon-containing bauxite used for the conventional chlorination reaction, this has not been heretofore considered detrimental since such hydrogen is converted to hydrogen chloride which can react with the iron impurities present. Inasmuch as such gaseous aluminum chloride reaction mixture requires after purification, the presence of such by-products in the reaction mixture was not only not of great concern, but the use of formed hydrogen chloride to reduce iron impurities present in the bauxite has been relied on as one manner of converting such impurities to a form facilitating their removal.

In contradistinction therewith, practice of the present invention utilizes reactants that include minimal amounts, if not the substantial absence of, hydrogen or hydrogen compounds.

The primary object of this invention is the provision of an improved process for the production of aluminum chloride.

Another object of this invention is the provision of an improved process for the production of aluminum chloride by the chlorination of selectively constituted carbon impregnated alumina.

It is another object of the present invention to provide an improved process for the effective and economical low temperature chlorination of carbon impregnated porous alumina of low alpha alumina content, high carbon content and being essentially free from hydrogen to the end of efficiently producing economically separable high purity aluminum chloride.

It is a further object of this invention to provide an improved process for the economic chlorination of relatively pure particles of carbon impregnated alumina having extended surface area, an average alpha alumina content of less than about 5% by weight, an average hydrogen content of less than about 0.5% by weight and an average carbon content of about 15–24% by weight based on the total alumina, carbon and hydrogen contents present, and which are substantially free of iron, silicon, and titanium impurities, to produce a gaseous effluent containing economically separable high purity aluminum chloride and carbon oxides in which at least about 25% by weight of such carbon oxides is carbon dioxide.

It is a further object of this invention to provide an improved process for economical production of aluminum chloride which is substantially free of phosgene.

Other and further objects of the present invention will become apparent from the following portions of the specification and from the accompanying drawings, in which FIG. 1 is a schematic view of a reaction vessel suitable for carrying out the chlorination of coked or carbon impregnated porous alumina in accord with the principles of this invention, and FIG. 2 is a schematic representation of suitable apparatus elements utilizable in the preparation of carbon impregnated alumina by the cracking of crackable hydrocarbon in accord with the principles of this invention.

There is provided, in accordance with the principles of this invention, an improved process for the efficient production of economically separable aluminum chloride of high purity which generally comprises exothermically reacting chlorine at a temperature of between about 450° C.–800° C. and preferably between about 500° C.–750° C., with selectively constituted particles of porous alumina having an average alpha alumina content of less than about 5%, especially less than about 3% and more especially less than about 1% by weight, said particles of alumina being intermixed and preferably coated or impregnated with carbon to provide an average carbon content of about 15%–24% and especially about 17%–19% by weight and having an average hydrogen content of less than about 0.5% by weight, desirably of less than about 0.3% and preferably less than about 0.1% (based on the total alumina, carbon and hydrogen contents), to form a gaseous effluent containing aluminum chloride and carbon oxides in which at least about 25%, desirably at least about 50% and preferably about 67% by weight of such carbon oxides is carbon dioxide, and from which high purity aluminum chloride may be economically separated and recovered.

In particular, the particles of porous alumina employable in the herein described chlorination process desirably have an average surface area of at least about 10 m.$^2$/g. and preferably at least about 80 m.$^2$/g., and an average loss on ignition (L.O.I.) of desirably less than about 5%, especially less than about 3% and most desirably less than about 1%; and the chlorination reaction is carried out at a temperature sufficiently low to preferably form a gaseous effluent containing aluminum chloride and preferentially substantially carbon dioxide with at most a minor residual amount of carbon monoxide, i.e. with the formed oxides of carbon consisting essentially of carbon dioxide. Reaction pressure of between about 0.1–10 atmospheres absolute generally may be used. Surface areas referred to herein are measured by the Brunauer, Emmett and Teller method described in Journal of American Chemical Soc., Vol. 60, pp. 309–319.

According to another significant feature of the invention, the porous or high surface area alumina utilizable herein is substantially pure alumina, i.e. having a total iron, silicon and titanium impurities content of less than about 0.5% by weight and/or a sodium impurities content of at most about 1.0% and especially at most about 0.6% by weight, calculated as $Na_2O$, e.g. sodium carbonate, sodium aluminate, sodium silicate and the like. Such a substantially pure alumina is readily produced by the well known Bayer process mentioned above. Higher purity aluminas having an average sodium impurities content of at most about 3.0% and especially at most about 0.1% by weight, calculated as $Na_2O$, are even more suitable.

The preferred use herein of alumina produced by the Bayer process as a starting material has proved to be less costly than would be the use of bauxite since it has been found to be less difficult to dispose of the sodium impurities that result from the use thereof than to remove the iron, silicon and titanium impurities from the gaseous aluminum chloride reaction mixture. The latter impurities not only represent a loss of valuable chlorine in terms of the iron, silicon and titanium chloride by-products formed but, as noted above, markedly add to the difficulty and expense of the subsequent separation operations. Of course, substantially pure alumina having the requisite characteristics from any other source can also be employed as a starting material in the practice of the instant invention.

Such substantially pure alumina, from an appropriate source, is preferably made from alumina hydrate, calcined to convert the same into porous or high surface area alumina, i.e. prior to carbon impregnation. Such calcining may be carried out in a rotary kiln, oven, tower, tunnel, or the like, at a temperature of about 700° C.–1100° C., preferably about 800° C.–900° C., and most preferably about 850° C., whereby porous alumina is formed having an average alpha alumina content of less than about 5% by weight and less than about 5% by weight total firmly bound water content. Alpha alumina content referred to herein is determined by X-ray diffraction examination of the particles, and ascertaining the ratio of peak intensity for the 116 plane to the intensity of the peak for that same plane obtained from a standard alpha alumina specimen. Impregnation of the alumina with carbon can be effected simultaneously with the above mentioned calcination of the alumina hydrate or subsequent thereto, preferably the latter.

Such firmly bound water is not what is generally considered as absorbed or adsorbed water but is more firmly bound since it is still present after such calcining. Instead, such firmly bound water may be defined functionally as that water representing an average weight loss on ignition (L.O.I.) of less than 5% by weight, of the alumina. Specifically, L.O.I. as intended herein is ascertained by the standardized heating of the alumina to 300° C. to drive off surface adsorbed water followed by the further heating of such alumina to 1100° C., with weighing of the alumina after the 300° C. heating and again after the 1100° C. heating, and with 100 times the difference in weight, divided by the weight after the 300° C. heating, being the loss on ignition.

In connection with the loss on ignition determination of alumina particles which have a volatile impurities content, e.g. sodium impurities, and which are impregnated with carbon, allowance must be made for the fact that such carbon and volatile impurities volatilize during the heating. Therefore, to make this determination on coked alumina, the carbon content and soda ($Na_2O$) content of the sample are measured on separate duplicate samples before and after heating at 1100° C. The change in weight on ignition from loss of carbon and sodium impurities present is computed and subtracted from the total change in weight.

The above-mentioned conditions for calcining the alumina hydrate are significant to the extent that they should be such as to convert the particles to substantially water-free or anhydrous porous form, i.e. having at most about 5%, especially at most about 3% and more preferably at most about 1% by weight total bound or L.O.I. water content. In this regard, a higher temperature than about 1100° C. will usually cause the formation of undesired low surface area alpha alumina in amounts beyond the limits set forth above which result when observing the stated conditions, e.g. the 700–1100° C. range.

In this regard, the desired porous alumina possesses a comparatively high surface area, e.g. at least about 10 m.$^2$/g. and especially greater than about 80 m.$^2$/g., since such provides more carbon coated surface area to react with the chlorine gas, and as such the high surface area of the instant porous alumina is of significant importance.

It is likewise of significant importance that the average hydrogen content of the chlorination reactants be maintained within the limits specified above, since the presence of hydrogen or hydrogen compounds in both the reaction vessel and in the resultant gaseous effluent is highly detrimental from both operative and economic standpoints.

A highly preferred process for forming carbon impregnated alumina suitable for use in the practice of this invention comprises thermally cracking crackable hydrocarbon, and preferably a liquid hydrocarbon, in contact with substantially pure particles of porous or high surface area alumina, having an average alpha alumina content of less than about 5% and more especially less than about 3% by weight and an average loss on ignition of less than about 5% and more especially less than about 3% by weight. Such cracking is selectively effected at a temperature high enough to crack such hydrocarbon but below those temperatures that will effect a significant transformation of the high surface area alumina to alpha alumina, to thereby deposit in situ carbon produced by the cracking on the particles of alumina to form carbon impregnated or "coked" porous alumina, preferably without appreciable decrease in the effective surface area thereof, that has an average carbon content of about 15%–24% and more especially of about 17%–19% by weight. In such preferred process and at the cracking temperatures employed, as for example between about 800° C.–1100° C., sufficient amounts of the hydrogen and hydrogen compounds that are produced are continuously removed from the cracking site so that the carbon impregnated particles of porous alumina of the type desired have an average hydrogen content, i.e. hydrogen and hydrogen compounds, of, at most, less than about 0.5% by weight thereof (i.e. based on the total alumina, carbon and hydrogen contents). Alternatively, if such carbon impregnated particles of porous alumina of otherwise desired character have an undesirably high hydrogen content, such particles may be further treated, as by supplementally purging with dry nitrogen gas to drive off sufficient hydrogen therefrom to provide the requisite final average hydrogen content of less than about 0.5% by weight.

Inasmuch as a consumable coked or carbon impregnated porous alumina is sought for subsequent efficient and complete exothermic chlorination to aluminum chloride, according to the invention, the thoroughness and extent of the in situ deposition of carbon on the alumina and the degree of porosity or surface area of the coked alumina together with the antithetical requirement of low average hydrogen content are significant considerations.

The utilization, as herein described, of a substantially pure porous or high surface area alumina, and coking or carbon impregnation of the same by cracking of crackable hydrocarbons results in a thorough and optimum distribution of carbon in situ throughout the internal and external surfaces of the porous alumina at the cracking temperature employed to markedly contribute to overall energy savings as well as minimum loss of carbon values in the cracking and impregnation process, and to a more efficent chlorination reaction.

The substantially pure coked or carbon impregnated porous alumina of a character as described above, is exothermically reacted according to the principles of the present invention with chlorine in a suitable closed system, as for example in a kiln, on a moving belt, or as a fluidized or moving bed, to form a hot gaseous mixture or effluent containing aluminum chloride and carbon oxides, e.g. carbon dioxide and carbon monoxide, in which at least about 25% and desirably greater than 50% by weight of such carbon oxides is carbon dioxide. The temperature of the reaction should be maintained in the range of from 450–800° C., desirably at about 500–750° C., and most preferably at about 650–700° C.

As noted above, carbon impregnated alumina may be used for the chlorination reaction according to the invention, as long as the alumina particles have the requisite average alpha alumina content of less than about 5% and especially less than about 3% by weight and average loss on ignition of less than about 5% and especially less than about 3% by weight, and have an average hydrogen content of less than about said 0.5% and preferably less than 0.1% by weight and an average carbon content of about 15–24% and especially about 17–19% by weight, with such particles also being substantially free from iron, silicon and titanium impurities, and preferably having an average surface area of at least about 10 m.²/g.

FIG. 1 shows schematically a suitable chlorination vessel and associated aluminum chloride recovery apparatus for expediently carrying out the efficient and economical chlorination of coked alumina coupled in accord with the principles of this invention with a subsequent separation of the aluminum chloride produced thereby.

The illustrated closed system chlorination apparatus includes a fluidized bed reaction vessel 1 having a chlorinating gas inlet 2 at the lower end thereof, which can be in the form of a fluidizing gas distribution inlet of any suitable construction such as a perforated plate with auxiliary bubble caps 3, a gaseous effluent outlet 4 at the upper end thereof, and an inlet 5 disposed above the gas inlet 2 for introducing into the vessel fresh selectively constituted coked or carbon impregnated alumina particles to be chlorinated.

The chlorination reaction is expediently carried out, by upwardly passing the chlorine through the bed of carbon impregnated porous alumina in an amount sufficient to fluidize the bed and to react with coked or carbon impregnated alumina therein to form the gaseous reaction mixture or effluent containing aluminum chloride and carbon oxides. In particular, it is preferred that the chlorination temperature be sufficiently low to form a gaseous effluent containing aluminum chloride and carbon oxides in which at least 50% and preferably about 67% by weight of such carbon oxides is carbon dioxide. Most preferably, the temperature and the carbon content should be such that the gaseous effluent contains aluminum chloride and substantially only carbon dioxide or at most minor residual amounts of carbon monoxide and phosgene therein, such phosgene being less than 2% by weight of the carbon oxides and preferably below 1% thereof. As noted above, the reaction temperatures should be maintained in the range of from 450° C.–800° C. desirably in the range of 500° C.–750° C. and preferably at about 650° C.–700° C.

The concentration of phosgene in the effluent should be minimized as indicated above because phosgene represents a waste of chlorine in the process, its toxicity leads to undesirable health hazards, and it contaminates the aluminum chorlide recovered from the effluent.

The chlorine gas used for the chlorination is fed to distribution inlet 2 via line 6 and can be supplied from any source, such as a liquid chlorine storage supply.

While the chlorination reaction is generally carried out at ambient or normal pressure, i.e. about 1 atmosphere absolute, negative or vacuum pressures down to about 0.1 atmosphere absolute as well as positive or elevated pressures up to about 10 atmospheres absolute may be used. Thus, the chlorination reaction can be carried out effectively at a pressure of between about 0.1–10 atmospheres absolute. However, while lower pressures lead to more complete reaction and high efficiency, higher pressures permit a greater throughput which normally offsets any decrease in efficiency. The preferred pressure range is about 1–3 atmospheres absolute.

The exothermic chlorination reaction should be desirably self-sustaining, i.e. without the need for externally applying heat to the system, yet be carried out at the lowest efficient temperature, e.g. 450° C.–800° C., especially to minimize material construction problems. Inherent by-product hydrogen chloride and sodium aluminum chloride which are produced from the hydrogen and sodium impurities in the coked alumina used, and chlorine gas itself, represent potentially corrosive substances which are concomitantly less destructive at lower chlorination temperatures.

The chlorination reactor vessel 1 is constructed of suitable materials which will withstand the ambient elevated, and preferably exothermic, temperature conditions, pressure conditions used (e.g. up to 10 atmospheres absolute), and the action of chlorine with consequent degradation of the vessel and contamination of the effluent, and at the same time be of such character as to be effectively sealable against the undesired presence of air and moisture.

Although not forming a part of the subject invention, the gaseous or vaporous aluminum chloride resulting from the herein described chlorination process may be economically recovered from the hot gaseous reaction effluent emanating from the chlorination reaction vessel 1 through conduit 7 in suitable separation and recovery means 8 disposed in closed circuit therewith. Such means may preferably incorporate selective condensation processes to produce aluminum chloride of high purity characteristics.

By appropriate control of the characteristics of the starting carbon impregnated porous alumina and the reaction environment, the chlorination reaction can readily be carried out so that a total of less than about 10% by weight of the chlorine used is converted by reaction with attendant hydrogen and precursor hydrocarbons used to achieve carbon impregnation. Furthermore, as described above, the chlorination process is carried out in a closed system and in the substantial absence of moisture to effectively form a gaseous effluent containing economically separable aluminum chloride and carbon oxides. Overall, the starting materials and reaction environment are preferably maintained such that the gaseous effluent is substantially free of water, and a total of less than about 10% and more especially less than about 5% by weight of the chlorine is converted by reaction with attendant hydrogen, hydrocarbons and moisture.

As generally pointed out above the nature and character of the coked alumina reactant for the chlorination process is a highly significant aspect in the practice of the present invention and a product having the desired character may be obtained by the thermal cracking of crackable hydrocarbons within a bed of suitably constituted alumina.

By way of illustrative example, such coked alumina reactant may be obtained by disposing alumina having the physical and chemical characteristics previously delineated, in the form of a fluidized heated bed in a cracking vessel maintained at a cracking temperature sufficient for the cracking yet insufficient to cause significant transformation of the porous alumina to alpha alumina, as for example between 800° C.–1100° C.

As shown schematically in FIG. 2 such vessel may suitably comprise a shaft furnace 11, having a fluidizing gas distribution inlet assembly 12 at the lower end thereof, an alumina introducing tube 13 at the upper end thereof, a gaseous effluent outlet 14 at the upper end thereof, and indirect heat exchange heating means 15 disposed in the reactor vessel for heating the alumina particles of the fluidized bed 16 and for providing the requisite cracking temperature. A lateral outlet 17 is disposed below the upper end of the bed for withdrawing coked or carbon impregnated alumina bed particles at a selective bed level. Preferably the bed 16 of the alumina particles is fluidized by upward passage of at least partially crackable hydrocarbon-containing gas such as methane, ethane and/or propane, therethrough.

Thermally crackable hydrocarbon, suitably a hydrocarbon which is liquid at injection temperatures, is injected into the bed through a plurality of radially disposed injection nozzles 18 into the vicinity of the heating means 15 for cracking in the bed 16 to produce carbon. Such carbon is directly deposited *in situ* throughout the internal and external surfaces of the porous alumina, thereby forming a layer of coked carbon which coats or impregnates the alumina particles.

The injection nozzles 18 are preferably positioned so that the injected thermally crackable hydrocarbon can be cracked almost immediately at the desired cracking temperature. Since a portion of each of the nozzles 18 projects into the reactor vessel 11 and is subjected to the cracking temperatures, the issuing hydrocarbon will be preheated. Means (not shown) for preheating the crackable hydrocarbon, e.g. liquid or solid hydrocarbon, prior to reaching the injection nozzles can be provided if desired so that the hydrocarbon will readily flow from the nozzles and be at optimum temperature for the cracking and coking operation. The injection nozzles 18 are also positioned at a level sufficiently above the distribution inlet 12 to avoid coking and clogging thereof and disruption of the bottom portion of the bed.

As illustrated, the indirect heat exchange means 15 may be provided as spaced apart elongated tubular elements 19 extending downwardly into the reactor vessel 11 for immersion in the fluidized bed 16 sufficiently to heat the bed to the desired cracking temperature. A fuel line 20 is provided to feed combustible fuel, e.g. recycled gas from outlet 14, natural gas, fuel oil, coke breeze, etc., from a source, via distribution lines 21 to open flame burners within elements 19 for combustion with air entering through inlets 22. The combustion products exit through lines 23.

The use of normally liquid hydrocarbon for the cracking reaction is preferred since such appears to result in a more reactive product. The reasons for such improved result are not fully understood at the present time but it is believed that such may occur possibly because the injected liquid hydrocarbon wets the alumina before being cracked. While normally gaseous hydrocarbon such as methane, ethane or propane may be used for the cracking, it has been found that such apparently leads to the formation of somewhat thicker coatings on the exterior of the alumina particles which act to effectively decrease the requisite high surface area thereof. More specifically, coked alumina resulting from the use of a normally gaseous crackable hydrocarbon may have a marked reduction in the original high surface area of the porous alumina, whereas the coked alumina resulting from the use of normally liquid hydrocarbon for the cracking substantially retains the original desirable high surface area.

As to normally liquid hydrocarbons, fuel oil, e.g. No. 6 fuel oil and commercial Bunker C fuel oil, are economically preferred types thereof. Generally, the higher the aromatic or unsaturated hydrocarbon content present, the more suitable will the liquid hydrocarbon be, since a corresponding higher fixed carbon content will be available for *in situ* deposition upon cracking, while a proportionately lower content of hydrogen produced by the cracking will be available for undesirable retention on the coked carbon coated or carbon impregnated porous alumina including carbon which may be combined with hydrogen in hydrocarbon form or other combination form.

Cracking temperatures of about 750° C.–1100° C. will generally lead to both efficient cracking of the hydrocarbon values and the desired *in situ* deposition of carbon on the alumina, to the desired end of producing a coked or carbon impregnated alumina having a carbon content of about 15%–24%, and more preferably about 17%–19%, by weight thereof, without detriment to the heretofore stated requisite characteristics of such alumina.

Temperatures below about 750° C. in the cracking zone will generally lead to inefficient and incomplete cracking and poor deposition of carbon as well as adsorption, chemisorption, occlusion and/or complexing of excessive hydrogen on the coked alumina particles, e.g. in hydrocarbon or other combination form, whereas temperatures above about 1100° C., will increasingly cause transformation of the porous alumina to alpha form and consequent decline in surface area. The preferred operating temperature for the cracking and coking reaction is about 800–900° C.

In operation of the unit, a portion of the gaseous effluent in outlet 14 must be continuously bled off to remove accumulated hydrogen from the system and to thereby maintain the average hydrogen content in the coked alumina so as to be at most about 0.5% and preferably less than about 0.1% by weight thereof (i.e. based on the total alumina and hydrogen contents). As previously noted, this markedly contributes to minimizing losses of chlorine in the chlorination operation which is one of the paramount economic considerations in the commercial viability of the process.

While the cracking and coking reaction is normally carried out at atmospheric pressure, slightly negative or vacuum pressures, e.g. down to 0.1 atmospheres absolute, as well as positive or elevated pressures, e.g. up to about 10 atmospheres absolute, can be used, if desired, to enhance the thermal cracking and *in situ* coking of the crackable hydrocarbon on the alumina particles. Generally, pressures of between about 0.1–10 atmospheres absolute can therefore be used for cracking reaction. Higher pressures within such range are preferred, however, since the output of the equipment is increased. The preferred range is about 1–3 atmospheres absolute.

By way of further illustrative example, the following is exemplary of the preferred mode of practicing the herein disclosed invention.

EXAMPLE

Substantially pure porous alumina particles of about 100 mesh average particle size, produced from bauxite by the Bayer process, containing less than about 0.5% by weight total iron, silicon and titanium constituents and about 0.25% by weight sodium constituents, calculated as $Na_2O$, and precalcined at about 850° C. to provide a final calcined product having less than about 5% by weight alpha alumina content, less than about 3% by weight L.O.I. and a surface area of about 100 m.$^2$/g., and which had been impregnated with carbon by thermally cracking liquid hydrocarbon in contact therewith, and having an average carbon content of about 17% by weight and an average hydrogen content of less than about 0.18% by weight (based on the total alumina, carbon and hydrogen contents), were fed at a rate of 36 pounds per hour into a chlorination fluidized bed reaction vessel of the general type shown in FIG. 1.

The coked carbon coated or carbon impregnated alumina particles were fed continuously to reactor vessel 1 for chlorination with dry chlorine gas upwardly passed through gas distribution inlet 2 at a rate of 60 pounds per hour. The chlorine gas was fed at a flow rate sufficient to fluidize the thus fed coked alumina particles and react therewith. The reaction between the chlorine gas and the coked alumina particles was exothermic and a chlorination temperature of about 635° C. was maintained using a pressure between 1–2 atmospheres absolute.

The system was maintained substantially free from water, free oxygen-containing gas, free hydrogen-containing gas and hydrocarbons such that less than about 5% by weight of the chlorine was converted by reaction with attendant water, hydrogen and hydrocarbons.

The gaseous effluent at about 635° C. passing through outlet 4 was fed to the aluminum chloride separation and recovery components 8, where the aluminum chloride was condensed and separated at a rate of 72 pounds per hour. Such gaseous effluent, which was substantially free from water, contained vaporous or gaseous aluminum chloride as well as carbon dioxide and carbon monoxide (the $CO_2$ content being about 80% by weight of the carbon oxides), together with entrained dust including carbon and coked alumina as well as residual impurities present in the starting material, and was so constituted as to permit the economic recovery of high purity aluminum chloride therefrom.

As will now be apparent to those skilled in the art, the closed cycle nature of the operation permits the chlorination to be carried out in the absence of moisture and air, and because the coked alumina used is essentially free from moisture, hydrocarbons, hydrogen and oxygen as well as effectively free of iron, silicon and titanium constituents, but yet with the presence of a proper content of carbon uniformly and thoroughly distributed throughout the high surface area alumina particles, a most efficient and economic chlorination reaction is provided which proceeds uniformly and essentially to completion and which effectively consumes the coked alumina material in question. Loss of chlorine to by-product reactions is minimized or avoided entirely and complex after-purification of the product is unnecessary, even though at most about 1.0% by weight sodium impurities calculated as $Na_2O$ may be initially present.

The advantages of the described *in situ* deposition on the porous alumina of the cracked carbon values for preparing the precursor carbon impregnated alumina used herein, enables the chlorine to use up completely such carbon values in the exothermic chlorination reaction without significant loss of unreacted chlorine in the gaseous reaction mixture or excessive formation of chlorinated products such as carbon tetrachloride, phosgene and hydrogen chloride, while shifting the reaction equilibrium in favor of high carbon dioxide formation (exothermic reaction) and low carbon monoxide formation rather than high carbon monoxide formation (endothermic reaction) and low carbon dioxide formation. Such favored equilibrium phenomenon of course insures full utilization of the carbon present in the system while avoiding the need for supplying heat externally to carry out on endothermic reaction.

Since it is commercially difficult to recover chlorine gas present in the off gas from the chlorination reaction, and since the off gas also contains only small amounts of phosgene, hydrogen chloride and chlorine in addition to some carbon monoxide and a predominant amount of carbon dioxide, the chlorination reaction of the invention, especially when using the stated type of coked alumina, represents a significant commercial improvement in the overall production of aluminum chloride.

What is claimed is:

1. Process for the production of aluminum chloride which comprises reacting chlorine at a temperature of between about 450°–800° C. with alumina having an average alpha alumina content of less than about 5% by weight and an average surface area of at least about 10 m.$^2$/g., said alumina being intermixed with carbon and compositely having an average hydrogen content of less than about 0.5% by weight and an average carbon content of about 15–24% by weight based on the total alumina, carbon and hydrogen contents present, to form a gaseous effluent containing aluminum chloride and carbon oxides in which at least about 25% by weight of such carbon oxides is carbon dioxide, and recovering the aluminum chloride from the gaseous effluent.

What is claimed is:

2. Process according to claim 1 wherein the reaction is carried out substantially exothermically.

3. Process according to claim 1 wherein the carbon oxides in the gaseous effluent comprise at least 50% by weight of carbon dioxide.

4. Process according to claim 1 wherein the carbon oxides in the gaseous effluent comprise at least two thirds by weight carbon dioxide.

5. Process according to claim 1 wherein the carbon oxides in the gaseous effluent comprise less than 2% by weight of phosgene.

6. Process according to claim 1 including the step of maintaining the temperature between about 500–750° C.

7. Process according to claim 1 wherein the alumina contains iron, silicon and titanium impurities in a total content of less than about 0.5% by weight.

8. Process according to claim 1 wherein the alumina contains sodium impurities not exceeding about 1.0% by weight calculated as $Na_2O$.

9. Process according to claim 1 wherein said alumina is impregnated with carbon.

10. Process according to claim 9 wherein the impregnated alumina has an average hydrogen content of less than about 0.3%.

11. Process according to claim 1 wherein the gaseous effluent is maintained substantially free of water.

12. Process according to claim 1 wherein the reaction is carried out substantially exothermically at a temperature of between about 500–750° C. in the substantial absence of chlorine reactable hydrogen and the alumina contains iron, silicon and titanium impurities in a total content of less than about 0.5% by weight and sodium impurities not exceeding about 1.0% by weight calculated as $Na_2O$.

13. Process according to claim 12 wherein the reaction is carried out at a pressure of between about 0.1–10 atmospheres absolute, and the alumina has an average alpha alumina content of less than about 3% by weight, an average surface area of at least 80 m.$^2$/g., and an average carbon content of about 17–19% by weight.

14. A process in accordance with claim 1 wherein the alumina is in the form of discrete particles.

15. Process according to claim 1 wherein the reaction is carried out in a fluidized bed of particles of alumina.

16. Process according to claim 1 wherein said alumina has an average loss on ignition of less than about 5% by weight.

17. Process according to claim 1 wherein said alumina has an average loss on ignition of less than about 3% by weight.

18. Process according to claim 1 wherein said alumina has an average loss on ignition of less than about 1% by weight.

19. Process according to claim 1 wherein said alumina has an average sodium impurities content of less than about 0.3% by weight calculated as $Na_2O$.

20. Process according to claim 1 wherein said alumina has an average sodium impurities content of less than about 0.1% by weight calculated as $Na_2O$.

21. Process according to claim 1 wherein said alumina has an average alpha alumina content of less than about 3% by weight.

22. Process according to claim 1 wherein said alumina has an average alpha alumina content of less than about 1% by weight.

23. Process according to claim 1 wherein said reaction is carried out at a pressure between about 0.1 to 10 atmospheres absolute.

24. Process according to claim 1 wherein the alumina has an average surface area of at least about 80 m.$^2$/g.

25. Process according to claim 1 wherein said impregnated alumina has an average carbon content of about 17–19% by weight.

26. Process according to claim 9 wherein the impregnated alumina has an average hydrogen content of less than about 0.1%.

27. Process for the production of aluminum chloride which comprises reacting chlorine substantially exothermically and at a temperature of between about 450–800° C. with selectively constituted alumina having an average alpha alumina content of less than about 5% by weight, an average surface area of at least about 10 m.$^2$/g., an iron, silicon and titanium impurities content in a total of less than about 0.5% by weight and a sodium impurities content of at most about 1.0% by weight calculated as $Na_2O$, said alumina being in the form of discrete particles impregnated with carbon and compositely having an average hydrogen content of less than about 0.5% by weight and an average carbon content of about 15–24% by weight based on the total alumina, carbon and hydrogen contents present to form a gaseous effluent containing aluminum chloride and carbon oxides in which at least about 50% by weight of such carbon oxides is carbon dioxide, and recovering the aluminum chloride from the gaseous effluent.

References Cited

UNITED STATES PATENTS 3,760,066    9/1973    Calcagno et al. _____ 423—496

MILTON WEISSMAN, Primary Examiner

U.S. Cl. X.R.

423—136; 252—188.3

UNITED STATES PATENT OFFICE
CERTIFICATE OF CORRECTION

Patent No. 3,842,163　　　　　　　　Dated October 15, 1974

Inventor(s)　Allen S. Russell, et al

It is certified that error appears in the above-identified patent and that said Letters Patent are hereby corrected as shown below:

Column 3, line 68, "3.0%" should read -- 0.3% --;
Column 6, line 49, "chorlide" should read -- chloride --;

Column 9, line 20, after "for" insert -- the --;

Column 10, line 57, delete "What is claimed is:"

Signed and Sealed this

Thirty-first Day of August 1976

[SEAL]

Attest:

RUTH C. MASON
*Attesting Officer*

C. MARSHALL DANN
*Commissioner of Patents and Trademarks*